Figure 1:
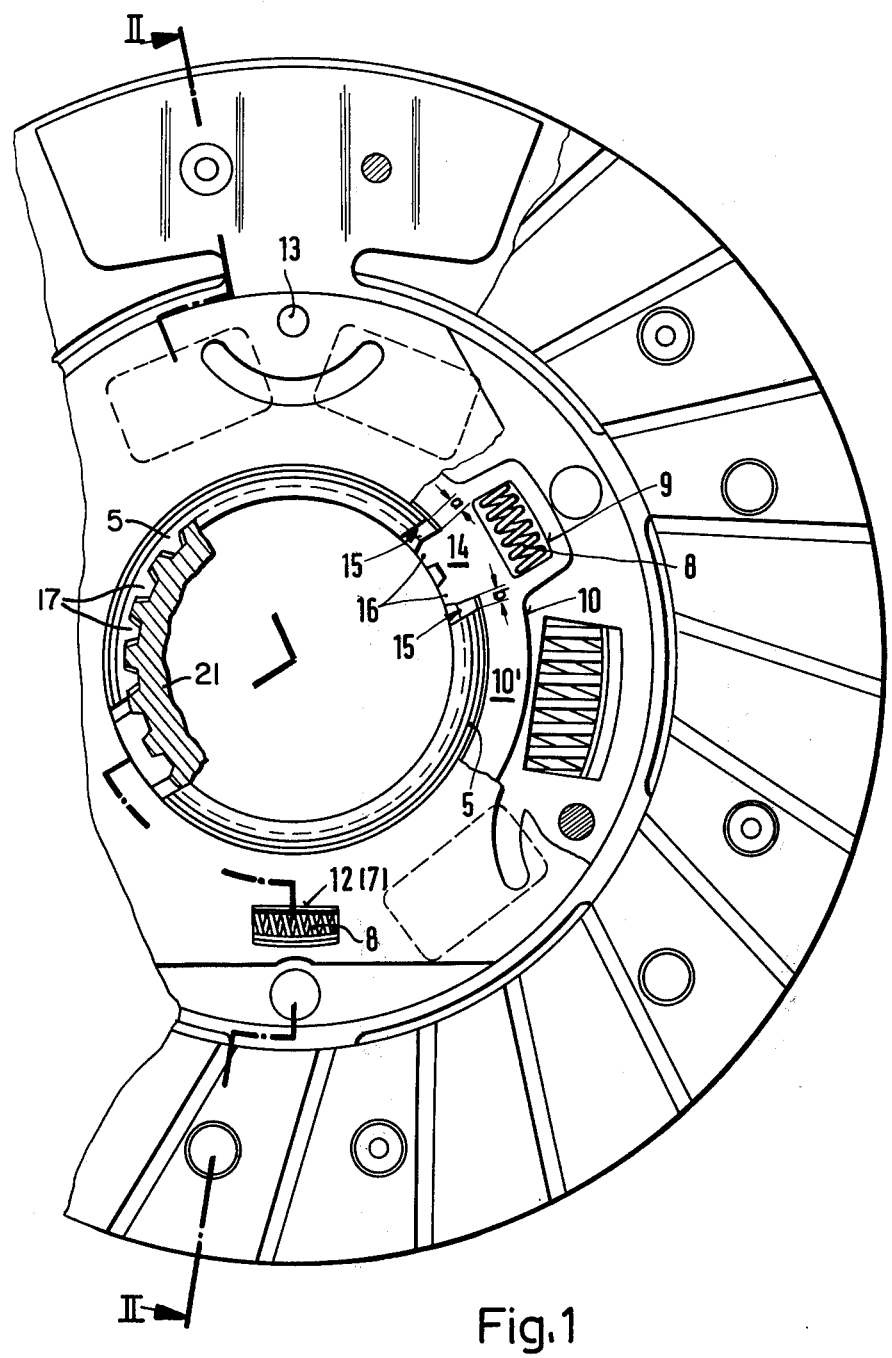

United States Patent [19]

Maucher

[11] 4,024,938

[45] May 24, 1977

[54] CLUTCH DISK WITH PLURAL DAMPERS

[75] Inventor: Paul Maucher, Sasbach, Germany

[73] Assignee: LuK Lamellen und Kupplungsbau GmbH, Buhl, Germany

[22] Filed: Sept. 30, 1975

[21] Appl. No.: 618,219

[30] Foreign Application Priority Data

Oct. 2, 1974 Germany .......................... 2447015

[52] U.S. Cl. ........................................... 192/106.2
[51] Int. Cl.² .......................................... F16D 3/14
[58] Field of Search ...................... 192/106.2, 106.1

[56] References Cited

UNITED STATES PATENTS

| | | | |
|---|---|---|---|
| 2,745,268 | 5/1956 | Reed ........................... | 192/106.2 X |
| 3,414,101 | 12/1968 | Binder et al. ................ | 192/106.2 X |
| 3,800,931 | 4/1974 | Maucher ..................... | 192/106.2 X |
| 3,863,747 | 2/1975 | Werner et al. .............. | 192/106.2 X |

FOREIGN PATENTS OR APPLICATIONS 1,200,013  7/1970  United Kingdom ............ 192/106.2

Primary Examiner—Benjamin W. Wyche
Attorney, Agent, or Firm—Herbert L. Lerner

[57] ABSTRACT

Clutch disk including at least two damping devices disposed in an energy transfer path between a friction lining support and a respective output member, one of the damping devices being effective over a given rotary angle by itself, and the other of the damping devices being effective over a further rotary angle either without the given rotary angle of the one damping device or in addition thereto, both of the output members being profiled parts matching the other mating profiled parts, the profiled part of the other of the damping devices being a hub member having torsional play with respect to the profiled part mating therewith which corresponds to the torsional play of the one damping device, the output member for the one damping device being within the axial extension of the hub member for the other damping device, and extending in radial direction through the hub member, both of the output members matching with a common mating profile.

11 Claims, 2 Drawing Figures

CLUTCH DISK WITH PLURAL DAMPERS

The invention relates to clutch disks, such as have become known from German Published Non-prosecuted Application DOS No. 2,002,039 and U.S. Pat. No. 3,414,101, wherein at least two damping devices are disposed in an energy transfer path between a friction lining support and a respective output member, the first damping device being effective over a given rotary angle by itself, and the second damping device being effective over a further rotary angle, either without the first or given rotary angle or in addition thereto, and both output members are profiled to match mating parts, the profile part of the second damping device being a hubmember which has torsional play with respect to the profiled part mating therewith which corresponds to the torsional play of the first damping device.

In various embodiments, especially when used in trucks or other heavy vehicles, the clutch disks disclosed in the hereinbefore mentioned publication require an excessive amount of axial structural space. Therefore, an object of the invention of the instant application is to provide a clutch plate of the foregoing type which requires an extremely small amount of axial structural space, and more particularly, that the axial space that is required may not be greater than the space required by clutch plates with only one damping device in the energy transfer path between the friction linings and the hub thereof.

With the foregoing and other objects in view, there is provided, in accordance with the invention, a clutch disk of the foregoing type, wherein the output of the first damping device is within the axial extension of the hub member for the second damping device, and extends in axial direction through the hub member, both of the output members matching with a common mating profile. In accordance with a specific additional feature of the invention, the common mating profile is the toothing of a transmission shaft. By means of such a construction, the damping device for the first torsional or rotational angle can be located so close to the damping device for the succeeding torsional or rotational angle, that the clutch disk constructed in accordance with the invention requires no more space in axial direction than that required for conventional clutch plates with only one damping device.

In accordance with another feature of the invention, the hub member is formed with at least one recess extending in axial direction but limited in peripheral direction, the output member of the first damping device projecting into the recess.

In accordance with yet another feature of the invention, the output member of the first damping device is a part annularly surrounding the hub member of the second damping device and is formed with at least one region thereof radially extending into the recess, the region of the output member having a profile corresponding to that of the mating profile. A further feature of the invention calls for the annular part to be a sheet-metal part.

In accordance with an added feature of the invention, the recess formed in the hub member of the second damping device serves as a stop for the radially inwardly extending region, rotation of the output part of the first damping device relative to the hub member of the second damping device being limited in either rotary direction.

In accordance with a further feature of the invention, the recess formed in the hub member of the second damping device affords greater relative rotation of the hub member of the first damping devices than the rotational play corresponding to the range of rotation or torsion of the hub member of the second damping device relative to the respective mating profile. Thus, the possible torsional play or range of rotation is greater than the possible play between the teeth flanks of the hub member of the second damping device and of the transmission shaft.

A further reduction of the axial structural or construction space can be accomplished, in accordance with an additional feature of the invention, when the force storage means for the first damping device is, for example, a helical compression spring which is connected or in contact, on the one hand, with the output portion of the first damping device and is braced or abuts, on the other hand, a previously existing part, such as the defining edges of a window-shaped cutout or recess formed in the support plate of the friction lining or the mating disc which is rigidly secured thereto against relative rotation therewith. Furthermore, it is advantageous for the input part of the clutch disc or a part rigidly attached to the input part against relative rotation therewith to be in frictional contact with the output parts of both damping devices, depending, of course, upon what side of the friction lining support plate the first damper is located, namely, either the friction lining support plate per se or the mating plate, the part thereby becoming simultaneously the input part for both damping devices.

Hereinafter and in the figures, the invention is further explained with respect to an embodiment of a clutch plate wherein one damping device is effective over a first torsional or torque angle and wherein both damping devices are effective over the immediately succeeding torque angle.

Although the invention is illustrated and described herein as embodied in clutch disc, it is nevertheless not intended to be limited to the details shown, since various modifications and structural changes may be made therein without departing from the spirit of the invention and within the scope and range of equivalents of the claims.

Figure 2:
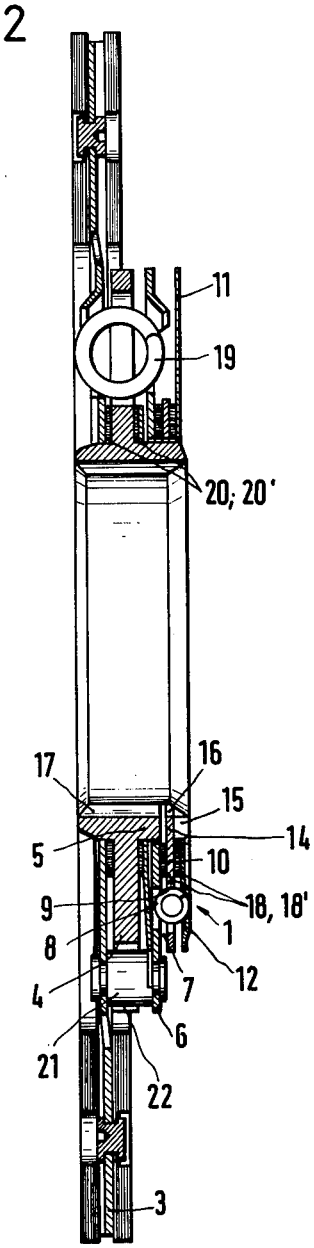

The construction and method of the invention, however, together with additional objects and advantages thereof will be best understood from the following description of specific embodiments when read in connection with the accompanying drawings, in which:

FIG. 1 is a partly broken-away elevational view of a clutch plate according to the invention as seen in axial direction; and FIG. 2 is a cross-sectional view taken along the line II — II in FIG. 1, in the direction of the arrows.

Referring now to the drawing, there is shown in FIGS. 1 and 2, a first damping device, or preliminary damper 1 and a second damping device, a main damping device 2. A friction lining support 3 is provided on one side of a flange 4 of a hub 5 which serves also as output part of the second damping device 2 and is rigidly connected to a cover plate 6 which is located on the other side of the hub flange 4.

The cover plate 6 is formed with a window-shaped cutout or recess 7 and a spiral compression spring 8 is braced therein, on the one hand, and in a window-shaped cutout or recess 9 formed in the output part 10 of the first damping device, on the other hand. On the other side of the output part or driven part 10, a cover plate 11 of the damping device 1 is provided in a window 12 of which a support parallel to the window 7 for the spring 8 results. The parts 6 and 11 are rigidly connected by a rivet 13 to each other against relative rotation. The output part 10 of the first damping device 11 is formed of sheet-metal and has a ring-shaped portion by which the hub 5 is surrounded. The output or driven part 10 has a radially inwardly directed portion 14 extending through a recess 15 formed in the hub 5. The portion 14 has a contour or profile 16 at a radially inner location thereof. With this profile 16, the clutch disk of the invention is seated on an opposing or counter-profile such as a transmission shaft with its gear teeth, which is slidable in axial direction, yet is fixed against relative displacement in peripheral direction. The contour or profiling of the transmission shaft 21 corresponds to that of the profile 16. In contrast thereto, the gear teeth or profile 17 of the hub 5 has rotary or torsional play with respect to its counter-profile, such as, for example, the profile of the transmission shaft 21. This torsional or torque play corresponds to the torsional play over which the damping device 1 is effective by itself. In the disclosed embodiment, the recess or cutout 15 affords more torsional play of the radially inwardly directed portion 14 of the part 10 than that possible between the hub of the second damping device 2 relative to its matching or counter-profile, the torsional range a, b, being thus greater than the possible tooth flank play of the second hub on the transmission shaft 21.

This hub 5 is rotatable with respect to the transmission shaft 21 which rotation corresponds to the play existing at the flanks of the gear teeth 17 relative to the gear teeth of the transmission shaft 21. This play at the gear flanks, i.e. the possible rotation of hub 5 with respect to the transmission shaft 21 corresponds also with that rotational range over which the first damping device is effective by itself.

Damping linings 18, 18', that are provided on both sides of the part 10 initially produce a frictional connection between the part 10 and the friction linings over the first torsional angle. To achieve a tight friction tolerance, spring elements effective in axial direction can also be provided in the first damping device 1.

In addition to helical compression springs 19, damping linings 20, 20' belong to the damping device 2. The damping linings 20, 20' are effective in addition to the friction action of the damping linings 18, 18', over the further torsional range, which is limited in a conventional manner by pins 21 disposed in recesses 22.

I claim:

1. Clutch disk comprising at least two damping devices disposed in an energy transfer path between a friction lining support and an output member of the clutch disk, said support and said output member rotatable relative to each other, each of said damping devices including an input part and an output member, one of said damping devices being effective over a given rotary angle by itself, and the second of said damping devices being effective over a further rotary angle, both of the output members of said first and second damping devices having profiled parts matching other mating profiled parts, the profiled part of the second of said damping devices being a hub member capable of relative rotation with respect to the profiled mating part corresponding to the rotary angle over which said first damping device is effective by itself, said output member for said first damping device disposed within the axial extension of said hub member for said second damping device, and extends in radial direction through said hub member.

2. Clutch disk according to claim 1 wherein said mating profiled parts is a common mating profile matched by both of said output members of said first and said second damping devices and is toothing of a transmission shaft.

3. Clutch disk according to claim 1 wherein said hub member is formed with at least one recess extending in axial direction but limited in peripheral direction, said output member of said first damping device projecting into said recess.

4. Clutch disk according to claim 3 wherein said output member of said first damping device is a part annularly surrounding said hub member of said second damping device and is formed with at least one region thereof radially extending into said recess, said region of said output member having a profile corresponding to that of said mating profile.

5. Clutch disk according to claim 4 wherein said annular part is a sheetmetal part.

6. Clutch disk comprising at least two damping devices disposed in an energy transfer path between a friction lining support and an output member of the clutch disk, said support and said output member rotatable relative to each other, each of said damping devices including an input part and an output member, one of said damping devices being effective over a given rotary angle by itself, and the second of said damping devices being effective over a further rotary angle, both of the output members of said first and second damping devices having profiled parts matching other mating profiled parts, the profiled part of the second of said damping devices being a hub member capable of relative rotation with respect to the profiled mating part corresponding to the rotary angle over which said first damping device is effective by itself, said output member for said first damping device disposed within the axial extension of said hub member for said second damping device, and extends in radial direction through said hub member and wherein a recess formed in said hub member through which said output member extends radially inwardly, serves as a stop for said radially inwardly extending output member by limiting rotation in either rotary direction of the output part of said first damping device relative to the hub member of said second damping device.

7. Clutch disk comprising at least two damping devices disposed in an energy transfer path between a friction lining support and an output member of the clutch disk, said support and said output member rotatable relative to each other, each of said damping devices including an input part and an output member, one of said damping devices being effective over a given rotary angle by itself, and the second of said damping devices being effective over a further rotary angle, both of the output members of said first and second damping devices having profiled parts matching other mating profiled parts, the profiled part of the second of said damping devices being a hub member capable of relative rotation with respect to the profiled mating part corresponding to the rotary angle over which said first damping device is effective by itself, said output member for said first damping device disposed within the axial extension of said hub member for said second damping device, and extends in radial direction through said hub member and wherein a recess formed in the hub member, through which said output member extends radially inwardly of said second damping device affords greater relative rotation of the radially inwardly extending output member of said first damping device than the torsional play corresponding to the range of rotation of the hub member of said second damping device relative to the respective mating profile.

8. Clutch disk according to claim 7 including force storage means acting in a direction opposing said relative rotation, said output member of said first damping device being connected through said force storage means with a part of the clutch disk fixed to an input part against rotation relative thereto.

9. Clutch disk according to claim 8 wherein said force storage means comprise at least one force storage member for each of said damping devices, said force storage members being operatively engaged with a common input part.

10. Clutch disk according to claim 9 including a part of the clutch disk connected to said input part, and said force storage members being directly engaged with said part of the clutch disk.

11. Clutch disk according to claim 9 wherein said input part common to both of said damping devices is in frictional contact with the output members of both of said damping devices.

* * * * *